(12) United States Patent
Rhodes

(10) Patent No.: US 6,669,405 B1
(45) Date of Patent: Dec. 30, 2003

(54) ASSEMBLY AND METHOD FOR JOINING DRAIN PIPE TO CONCRETE CATCH BASIN

(76) Inventor: Lester Kent Rhodes, P.O. Box 877, Beaver, OK (US) 73932

( * ) Notice: Subject to any disclaimer, the term of this patent is extended or adjusted under 35 U.S.C. 154(b) by 0 days.

(21) Appl. No.: 10/058,368

(22) Filed: Jan. 28, 2002

(51) Int. Cl.[7] .......................... E04B 1/682; F16L 17/00; F16L 33/16
(52) U.S. Cl. .......................... 405/36; 220/86.1; 52/442; 285/110
(58) Field of Search ................................. 277/314–316, 277/605, 642, 646; 285/96, 97, 100, 110; 405/36, 52; 52/423, 442; 222/478; 220/86.1

(56) References Cited

U.S. PATENT DOCUMENTS 4,986,436 A * 1/1991 Bambacigno et al. ...... 220/86.1
5,588,272 A * 12/1996 Haponski .................. 52/309.12

* cited by examiner

Primary Examiner—Thomas B. Will
Assistant Examiner—Tara L. Mayo
(74) Attorney, Agent, or Firm—Kenneth H. Jack; Davis & Jack, LLC

(57) ABSTRACT

An assembly and method for joining a drain pipe with a concrete catch basin, structural elements of the assembly including a concrete catch basin having a wall, the wall having inner and outer surfaces, the wall further having a plate embedded within the wall between the wall's inner and outer surfaces, the wall further having an outer aperture extending through the concrete wall from an outer surface of the plate to the outer surface of the concrete wall, and further having an inner aperture extending through the concrete wall from an inner surface of the plate to the inner surface of the concrete wall; the method including steps of cutting a pipe receiving aperture through the plate, lining the pipe receiving aperture with an expansible elastomeric ring, extending a drain pipe through the ring, and injecting elastomeric foam into the ring, causing the ring to expand, and to seal between the aperture and the pipe, securely holding and sealing the drain pipe in place upon the catch basin.

16 Claims, 9 Drawing Sheets

ASSEMBLY AND METHOD FOR JOINING DRAIN PIPE TO CONCRETE CATCH BASIN

CROSS REFERENCE TO RELATED U.S. PATENT APPLICATION

The Applicant hereby refers to his earlier and now pending U.S. Patent Application, as follows:

Applicant: Lester Kent Rhodes
Title: Assembly and Method for Joining
Drain Pipe to Catch Basin
Date Filed: Apr. 11, 2001
application Ser. No. 09/833,506
Art Unit No. 3673
Examiner: Mayo, Tara Some elements of structure and method steps disclosed in said earlier application coincide with those of the instant application.

FIELD OF THE INVENTION

This invention relates to water collecting catch basins. More particularly, this invention relates to concrete water collecting catch basins and methods and assemblies for joining lateral drain pipes thereto.

BACKGROUND OF THE INVENTION

Pre-cast concrete water catching or collecting basins or boxes are commonly buried beneath ground surfaces as a means for collection of surface water run off, and for conveyance of such water away from low lying areas. For example, divided highways commonly have a central median area formed as a troughs or ditches which tend to undesirably collect and retain rainwater. Drainage means are therefore commonly constructed as a components of highway medians. Such drainage means commonly comprises the described concrete water catching basin buried at a low point in such median so that the elevation of an upper edge of such basin coincides with ground level. A buried drain pipe typically extends laterally from such catch basin, passing beneath the roadway, and opening at a low drainage point at roadside. In operation, water collecting in the median flows into the upper opening of the catch basin and exits the catch basin at the opening of the drain pipe for lateral conveyance and emission at the roadside.

In order for concrete water catching basins of the type described above to receive a laterally extending drain pipe, the catch basin is commonly molded to include a circular pipe receiving aperture within at least one of its side walls. Such common molded pipe receiving side wall apertures undesirably dictate and control the size of the drain pipe which may be laterally extended from the catch basin. Where, for example, the catch basin is situated for drainage of a small watershed area, a lateral line drainage pipe having a narrow bore may be utilized to provide acceptable drainage. However, where the side wall aperture within the catch basin is large, a large bore drainage pipe must nevertheless be installed, resulting in an economical use of an oversized pipe. Conversely, where the catch basin is situated for drainage of a large water shed, a large lateral line drainage pipe is needed. Where catch basins available at the construction site have relatively small side wall apertures, a small drainage pipe may be compromisingly installed, threatening undesirable water back up.

The instant inventive assembly and method solves or ameliorates the above defects and deficiencies of common concrete water catching basin assemblies by providing means for selectively joining drain pipes having varyingly sized bores to concrete catch basins.

BRIEF SUMMARY OF THE INVENTION

In a preferred embodiment of the instant invention, an upwardly opening and downwardly opening concrete catch basin is molded to include at least a first two inch thick wall, such wall having a polyvinyl chloride plastic plate embedded therein. Preferably, such plate is approximately ⅜" thick, and forms an approximate twenty-four inch square. Suitably, the plate may be composed of sheets of galvanized steel, plastic coated steel, plastic, aluminum, aluminum alloy, composite laminate material or preservation treated wood. Also preferably, the embedded position of the plate within the wall is central, providing approximate 13/16" thicknesses of concrete extending outwardly and inwardly from the outer and inner surfaces of the plate. The concrete wall is preferably further molded to include outer and inner circular apertures, such apertures exposing portions of the outer and inner surfaces of the embedded plate. Preferably, the outer and inner apertures are circular, having diameters of approximately eighteen inches, such circular apertures being substantially centered over the outer and inner surfaces of the plate. Conventional concrete casting and molding methods may be utilized in order to fabricate the described catch basin wall including the described embedded plate, and inner and outer apertures.

In order to prevent moisture from seeping into spaces between the concrete wall and the embedded surfaces of the PVC plate, waterproof silicone calking is preferably applied to the inner and outer apertures, so that a calking seal spans between the inner peripheral surfaces of the outer and inner apertures, and the outer and inner surfaces of the PVC plate.

In use, several concrete catch basins identically configured as described above, may be delivered to a road construction site without regard to the particular sizes of lateral line drainage pipes which will be needed at various drainage points along the construction site. For example, a first concrete catch basin may be buried at low volume water collection point within a highway median ditch, and a second identical catch basin may be buried at a high volume water collection point within a "clover leaf" interchange. Immediately prior to burying the first catch basin within the median ditch, a ¾" to one inch saw blade receiving hole may be drilled through the exposed PVC plate of such catch basin. Thereafter, a reciprocating saw blade of, for example, a "saws all" tool may be extended through the saw blade receiving aperture, and such tool may be operated to cut a circular ten inch drain pipe receiving aperture through the plate. Preferably, such aperture is positioned centrally upon such plate. A similar procedure may be utilized in order to cut a sixteen inch diameter pipe receiving aperture through the PVC plate of the second catch basin installed at the relatively high water volume clover leaf interchange drainage area.

Upon cutting of the ten inch diameter and sixteen inch diameter pipe receiving apertures, the catch basins are placed within excavated pits at desired drainage points within the median and the clover leaf interchange, such pits having temporary ditches trenched laterally therefrom for receipt of lateral drain pipes.

Thereafter, the inner peripheral surfaces of the drain pipe receiving apertures are lined with elastomeric sealing rings, such rings preferably being elastomeric foam expansible rings of the type disclosed in pending U.S. application Ser.

No. 09/833,506 filed Apr. 11, 2001. The elastomeric ring chosen to line the ten inch diameter drain pipe receiving aperture preferably has an approximate ten inch outside diameter at the floor of its annular channel, and has an inside diameter of approximately 6 ¼ inches for receipt of a six inch outside diameter drain pipe. Corresponding dimensions of the elastomeric ring which lines the sixteen inch diameter drain pipe receiving aperture are approximately sixteen inches and approximately 12 ¼ inches for receipt of a twelve inch outside diameter drain pipe.

Suitably, though less desirably, other annulus sealing means, such as waterproof grout, waterproof mortar, or solid rubber seals may be utilized in place of the preferred expansible elastomeric ring.

Upon lining of the ten inch and sixteen inch drain pipe receiving apertures with the preferred expansible elastomeric rings, as described above, six inch and twelve inch drain pipes, typically composed of PVC plastic, are respectively extended through the elastomeric rings. Thereafter, elastomeric foam is compressively injected into the annular expansion spaces of the elastomeric rings, causing said rings to expand and to function as permanent seals spanning the annuli between the inner peripheral surfaces of the drain pipe receiving apertures, and the outer peripheral surfaces of the six inch and twelve inch drain pipes.

Upon configuration of the catch basins, elastomeric rings, and drain pipes as described above, side wall gaps and trenches are filled, leaving in place the concrete catch basins and their varyingly sized laterally extending drain pipes.

Alternately, instead of drilling a saw blade receiving aperture through the plates as described above, mandrel receiving apertures may be drilled through the plates, and heated conical mandrels may be drawn outwardly through such apertures, causing the pipe receiving apertures to be mandrel formed into out-turned nipples fitted for coupling engagements with the six inch and twelve inch drain pipes. Where the pipe receiving apertures are configured as out-turned nipples, the exemplary six inch and twelve inch drain pipes are preferably adhesively bonded to the distal ends of such nipples, no elastomeric ring being utilized.

Accordingly, it is an object of the present inventive assembly and method to provide a concrete catch basin capable of selective configuration in the field for joinery of lateral draining pipes having varying size of bores.

Other and further objects, benefits, and advantages of the present invention will become known to those skilled in the art upon review of the Detailed Description which follows, and upon review of the appended drawings.

DETAILED DESCRIPTIONS OF PREFERRED EMBODIMENT

Figure 1:
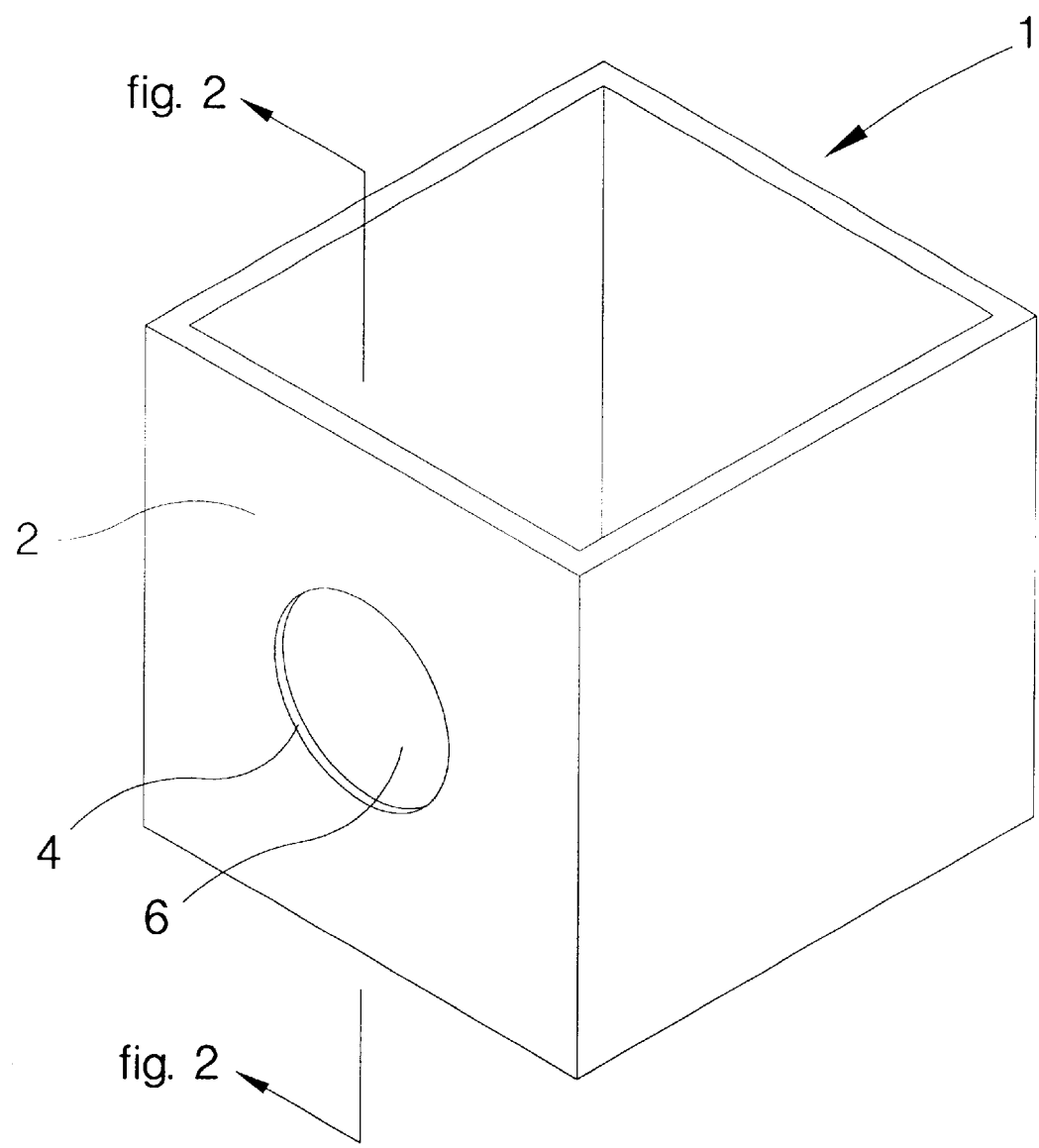
FIG. 1 is an isometric view of a preferred embodiment of the concrete catch basin of the instant inventive assembly and method.
Figure 2:
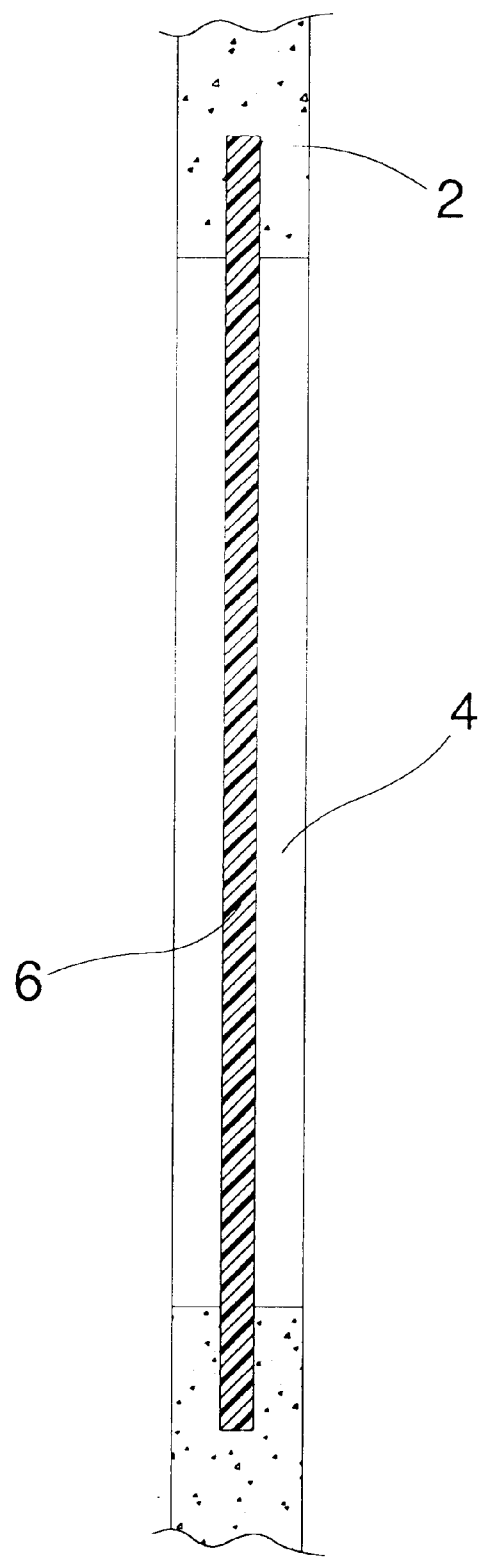
FIG. 2 is a sectional view as indicated in FIG. 1.

Referring now to the drawings, and in particular to FIG. 1, a concrete catch basin is referred generally by reference arrow 1. The concrete catch basin 1 has a side wall 2. Referring simultaneously to FIGS. 1 and 2, the side wall 2 has embedded therein a plate 6, the side wall 2 being molded to include an outer aperture 4 extending outwardly from the outer surface of plate 6, and an inner aperture 5 extending inwardly from the inner surface of plate 6.

Figure 3:
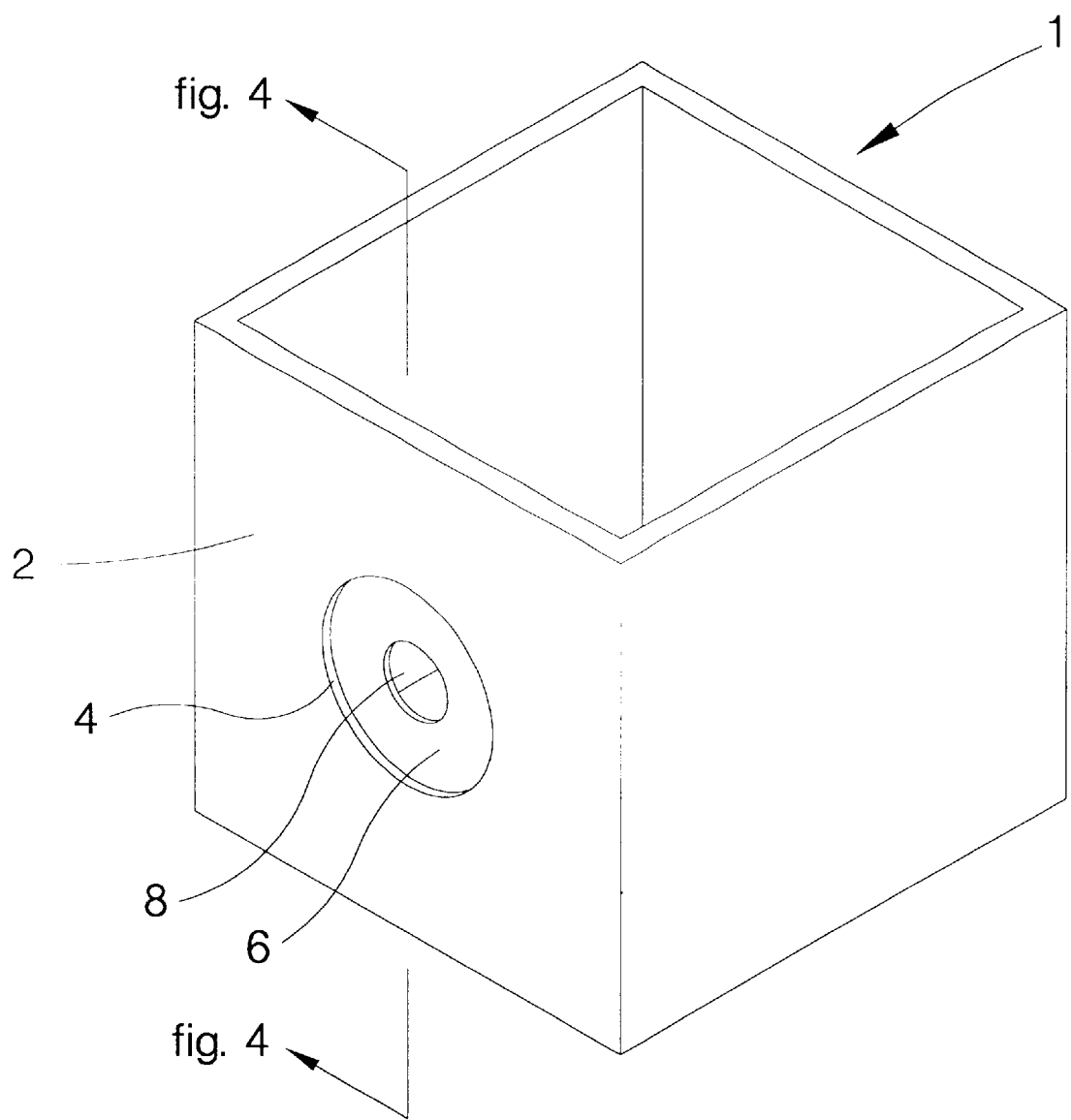
FIG. 3 redepicts FIG. 1, showing an added drain pipe receiving aperture extending through the embedded plate of the assembly.
Figure 4:
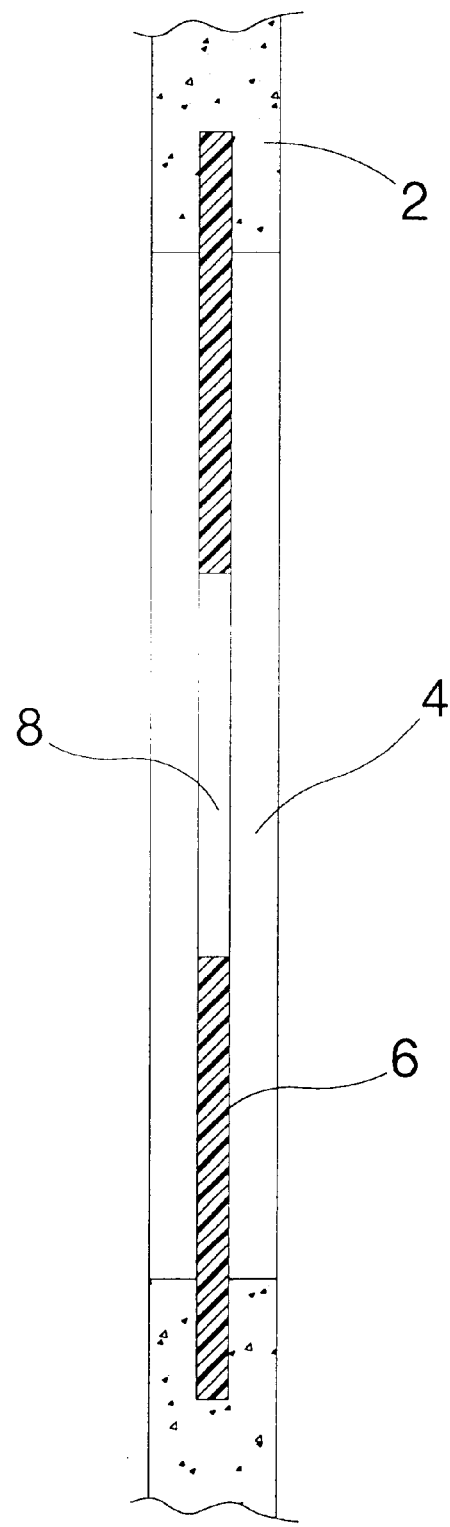
FIG. 4 is a sectional view as indicated in FIG. 3.
Figure 5:
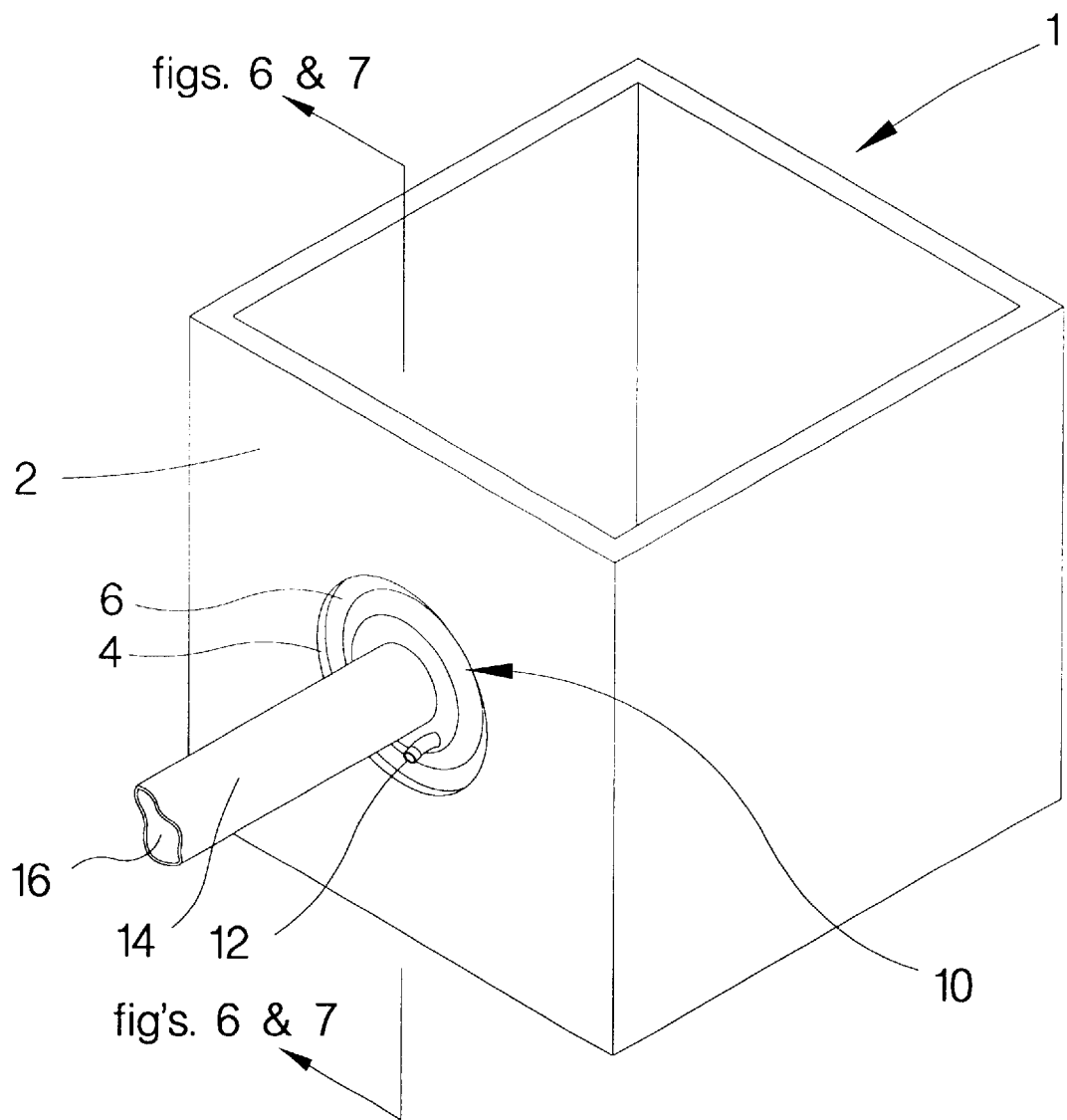
FIG. 5 redepicts FIGS. 1 and 3, the view additionally showing a drain pipe and a joining elastomeric sealing ring.
Figure 6:
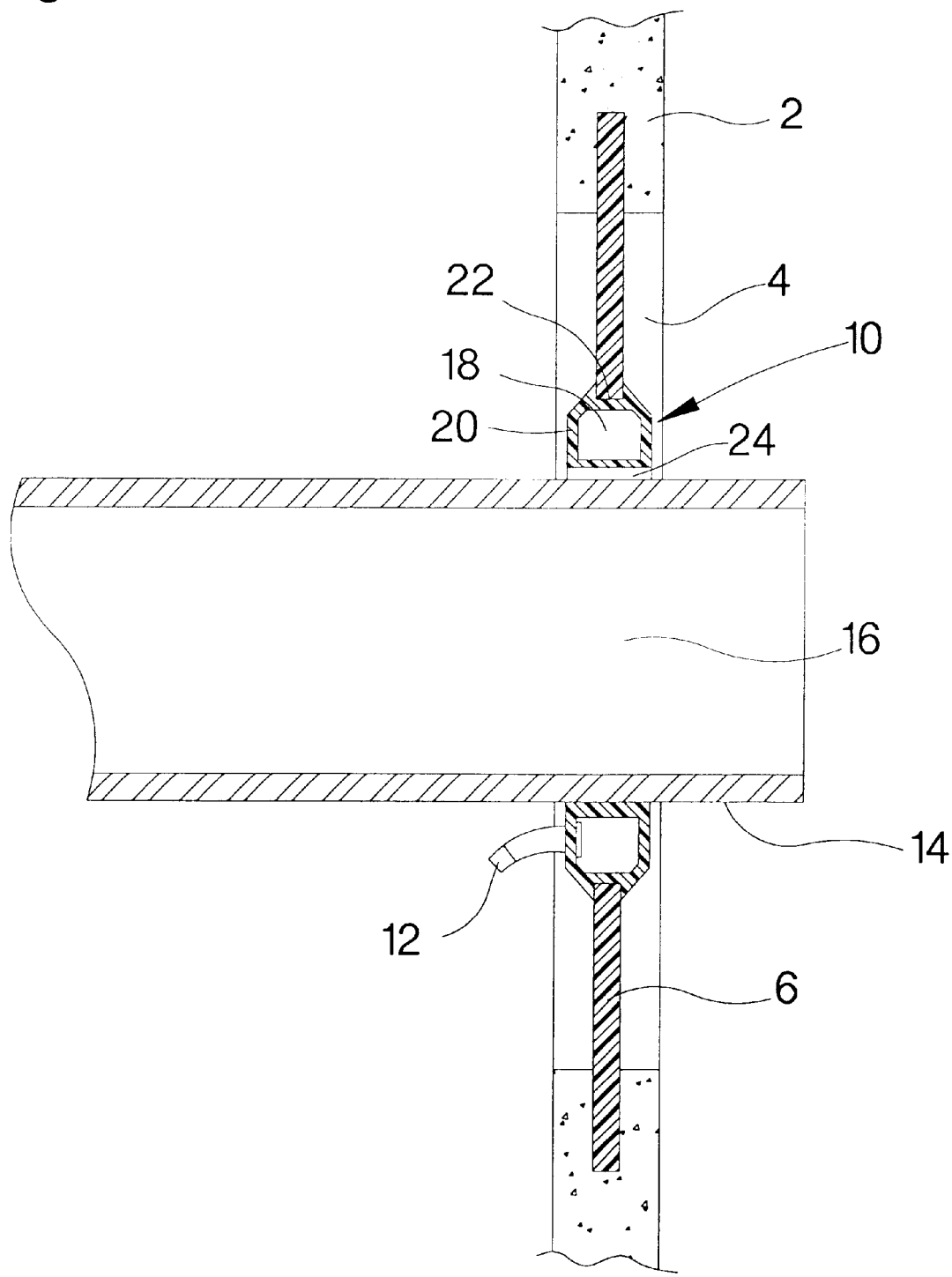
FIG. 6 is a sectional view as indicated in FIG. 5.

Referring simultaneously to FIGS. 1 and 3, a circular pipe receiving aperture 8 is preferably cut through plate 4. Alternately, referring simultaneously to FIGS. 1, 8, and 9, such aperture may be suitably configured as nipple 30 drawn outwardly by a heated mandrel from a similar plate 28. Such nipple 30 is preferably formed by means of drawing a heated conical mandrel (not depicted) outwardly through a mandrel receiving aperture, the bore of the nipple 30 initially comprising the mandrel receiving aperture.

Figure 7:
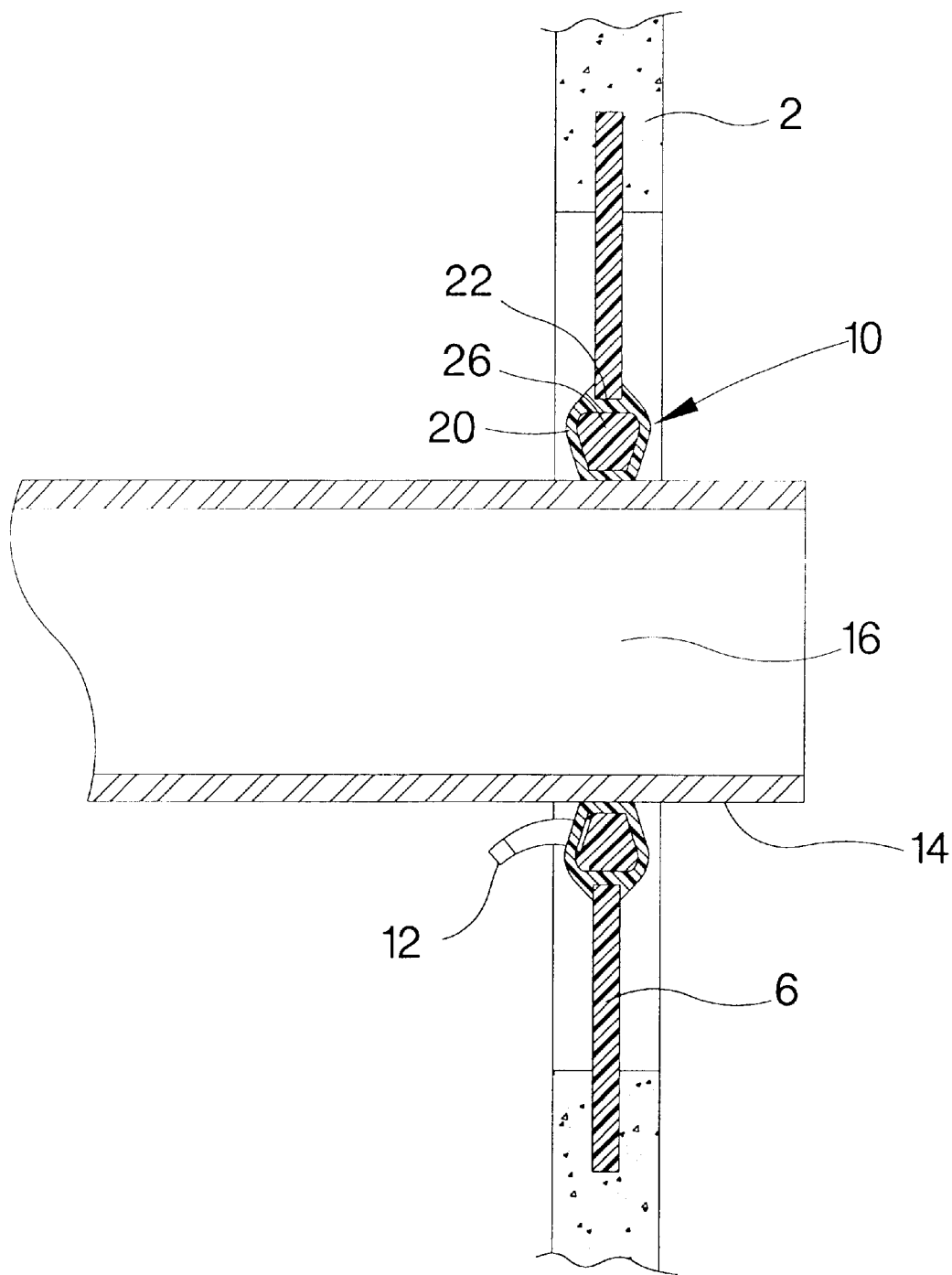
FIG. 7 is an alternate sectional view as indicated in FIG. 5, the view further indicating injected elastomeric foam.

Referring simultaneously to FIGS. 3–6, an expansible elastomeric sealing ring referred to generally by reference arrow 10 is preferably placed within pipe receiving aperture 8 so that such ring 10 lines said aperture, and so that such ring's outwardly opening annular channel 22 nestingly receives the annular inner peripheral surface of pipe receiving aperture 8. Thereafter, a drain pipe 14 is extended through the inner opening 24 of ring 10. Thereafter, elastomeric foam 26 is compressively injected into the annular expansion space 18 of ring 10 via check valve injection port 12, causing the walls 20 of ring 10 to expand, and causing the ring 10 to seal the annulus between the inner peripheral surface of pipe receiving aperture 8 and the outer peripheral surface of drain pipe 14. Upon installation as depicted in FIG. 7, the ring 10 provides both a waterproof seal directing water flow into the bore 16 of drain pipe 14 and secure positioning and mounting of drain pipe 14.

Figure 8:
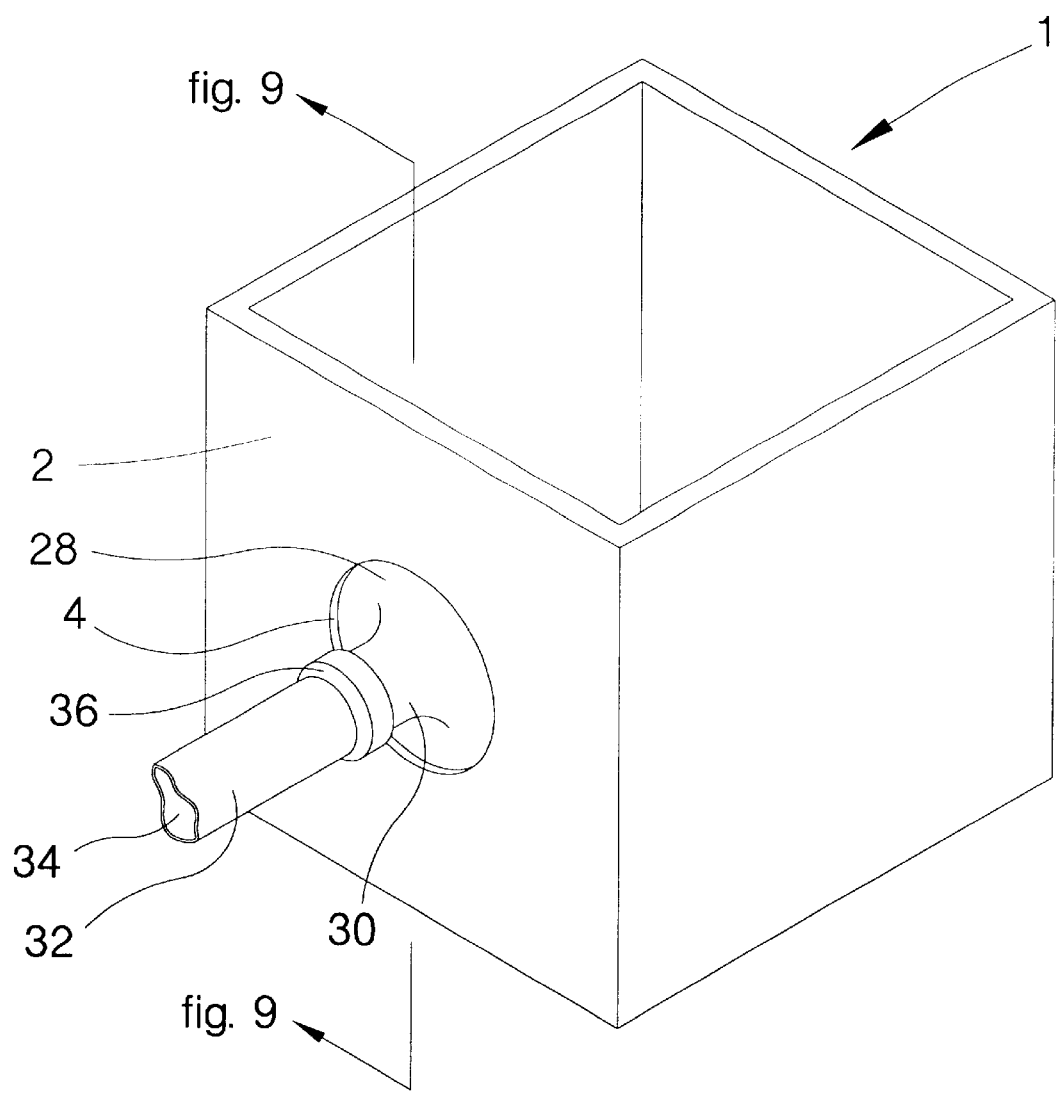
FIG. 8 is an isometric view of an alternate embodiment of the instant inventive assembly and method.
Figure 9:
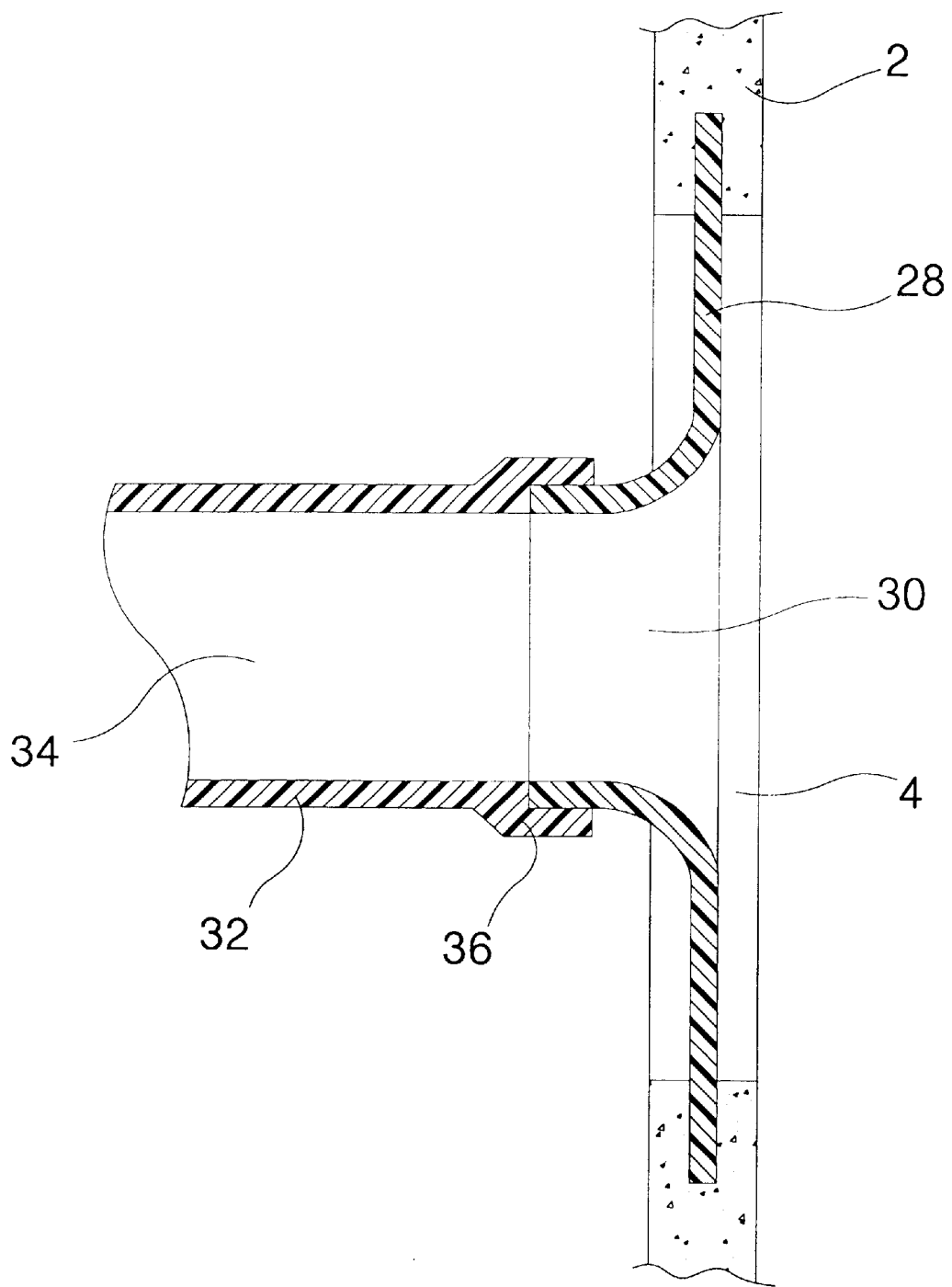
FIG. 9 is a sectional view as indicated in FIG. 8.

Alternately, referring to FIGS. 8 and 9, a drain pipe 32 having a belled end 36 may be adhesively joined to nipple 30 causing the bore 34 of drain pipe 32 to be continuous with the pipe receiving apertures of nipple 30.

Referring simultaneously to FIGS. 1 and 8, it can be seen that drain pipe receiving apertures of varying sizes may be cut through embedded plate 6, and that drain pipe receiving nipples of varying sizes may be drawn outwardly from embedded plate 28. Accordingly, the concrete catch basin 1 is advantageously adapted for selective configuration for receipt of variously sized drain pipes, lending to flexibility of use of such catch basin in the field.

While the principles of the invention have been made clear in the above illustrative embodiment, those skilled in the art may make modifications in the structure, arrangement, portions, components, and method steps of the invention without departing from those principles. Accordingly, it is intended that the description and drawings be interpreted as illustrative and not in the limiting sense, and that the invention be given a scope commensurate with the appended claims.

I claim:

1. A catch basin assembly comprising:
    (a) a concrete catch basin wall having inner and outer surfaces;
    (b) a plate embedded within the concrete wall between the inner and outer surfaces, the plate having inner and outer surfaces;

(c) an outer aperture extending through the concrete wall from the outer surface of the plate to the outer surface of the concrete wall;

(d) an inner aperture extending through the concrete wall from the inner surface of the plate to the inner surface of the concrete wall; and a pipe receiving aperture extending from the outer surface of the plate to the inner surface of the plate, the pipe receiving aperture having an inner peripheral surface.

2. The catch basin assembly of claim 1 further comprising a drain pipe extending through the pipe receiving aperture, the drain pipe having an outer peripheral surface, the respective inner and outer peripheral surfaces of the pipe receiving aperture and the drain pipe defining an annulus.

3. The catch basin assembly of claim 2 further comprising an elastomeric ring positioned within the annulus.

4. The catch basin assembly of claim 3 wherein the elastomeric ring comprises an annular expansion space, and further comprising elastomeric foam within said space, said foam expanding the elastomeric ring and sealing the annulus.

5. The catch basin assembly of claim 4 wherein the outer and inner apertures respectively have outer and inner peripheral surfaces, and further comprising outer and inner waterproof seals, said seals respectively spanning between the inner peripheral surface of the outer aperture and the outer surface of the plate and the inner peripheral surface of the inner aperture and the inner surface of the plate.

6. The catch basin assembly of claim 5 wherein the plate and the drain pipe comprise polyvinyl chloride plastic.

7. The catch basin assembly of claim 5 wherein the plate comprises a material selected from the group of plastic sheets, galvanized steel sheets, plastic coated steel sheets, aluminum sheets, aluminum alloy sheets, stainless steel sheets, composite laminate sheets, and wood sheets.

8. A catch basin assembly comprising at least a first vertically extending concrete wall and at least a first plate embedded within said wall, the at least first plate having inner and outer surfaces, the at least first vertically extending concrete wall having apertures exposing portions of the inner and outer surfaces of the at least first embedded plate, and a pipe receiving aperture extending from the outer surface of the plate to the plate's inner surface.

9. The catch basin of claim 8 further comprising an elastomeric sealing ring lining the pipe receiving aperture.

10. The catch basin of claim 8 further comprising a drain pipe extending through the elastomeric sealing ring.

11. The catch basin of claim 10 wherein the elastomeric sealing ring has an annular internal expansion space, and further comprising elastomeric foam expanding the annular expansion space and inwardly compressing the sealing ring against the drain pipe.

12. The catch basin of claim 11 wherein the drain pipe and the plate comprise polyvinyl chloride plastic.

13. A method for attaching a drain pipe to a concrete catch basin comprising steps of:

(a) embedding a plate within a wall of the concrete catch basin and configuring said wall to include inner and outer apertures exposing inner and outer surfaces of the embedded plate;

(b) cutting a circular aperture through the plate;

(c) lining the circular aperture with an expansible elastomeric ring;

(d) extending the drain pipe through the expansible elastomeric ring;

(e) expanding the expansible elastomeric ring until said ring seals against the circular aperture and against the drain pipe.

14. The method of claim 13 wherein the expanding step comprises injecting elastomeric foam into the expansible elastomeric ring.

15. The method of claim 14 wherein the cutting step comprises steps of drilling a blade receiving aperture through the plate, inserting a saw blade through said aperture, and operating said blade to cut the circular aperture.

16. The method of claim 15 wherein the lining step annularly and nestingly engages a peripheral surface of the expansible elastomeric ring.

* * * * *